United States Patent
Lee et al.

(10) Patent No.: US 11,331,878 B2
(45) Date of Patent: May 17, 2022

(54) DECORATION FILM AND ELECTRONIC DEVICE INCLUDING THE SAME

(71) Applicant: Samsung Electronics Co., Ltd., Suwon-si (KR)

(72) Inventors: Hyunggon Lee, Suwon-si (KR); Soonwoo Kwon, Suwon-si (KR); Yoojin Kim, Suwon-si (KR); Saehee Lee, Suwon-si (KR); Yunhui Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 16/721,021

(22) Filed: Dec. 19, 2019

(65) Prior Publication Data

US 2020/0198294 A1    Jun. 25, 2020

(30) Foreign Application Priority Data

Dec. 19, 2018   (KR) .................. 10-2018-0165256

(51) Int. Cl.
*B32B 7/12* (2006.01)
*B32B 15/08* (2006.01)

(52) U.S. Cl.
CPC ............ *B32B 7/12* (2013.01); *B32B 15/08* (2013.01); *B32B 2451/00* (2013.01); *B32B 2457/20* (2013.01)

(58) Field of Classification Search
CPC ....... B32B 7/12; B32B 15/08; B32B 2451/00; B32B 2457/20

(Continued)

(56) References Cited

U.S. PATENT DOCUMENTS

| 6,150,007 A | 11/2000 | Oshima et al. |
| 2012/0003489 A1 | 1/2012 | Ying |

(Continued)

FOREIGN PATENT DOCUMENTS

| KR | 20170107756 A | * | 9/2017 | |
| KR | 20180064610 A | | 6/2018 | |
| WO | WO-2017026633 A1 | * | 2/2017 | ........... B29C 43/003 |

OTHER PUBLICATIONS

Lee et al., WO 2017/026633 A1 machine translation, Feb. 16, 2017, entire translation (Year: 2017).*

(Continued)

*Primary Examiner* — Humera N. Sheikh
*Assistant Examiner* — Katherine A Christy

(57) ABSTRACT

An electronic device including a housing, a display, an adhesive layer, a first decoration layer, and a second decoration layer. The housing includes a front plate, a rear plate, and a lateral member surrounding a space between the front and rear plates. The display is viewed through at least a portion of the front plate. The adhesive layer is combined with one of the front and rear plates. The first decoration layer includes a first shape-cured layer and a first color layer. The first shape-cured layer is combined with the adhesive layer, has a first three-dimensional pattern, and is cured by an external stimulus. The second decoration layer includes a second shape-cured layer and a second color layer. The second shape-cured layer is combined with the first color layer, has a second three-dimensional pattern, and is cured by an external stimulus.

17 Claims, 14 Drawing Sheets

(58) Field of Classification Search
USPC .......................................................... 428/626
See application file for complete search history.

(56) References Cited

U.S. PATENT DOCUMENTS

| | | |
|---|---|---|
| 2014/0113089 A1 | 4/2014 | Liu et al. |
| 2014/0118903 A1 | 5/2014 | Hwang et al. |
| 2018/0147810 A1 | 5/2018 | Cheon |
| 2018/0157375 A1 | 6/2018 | Han et al. |
| 2018/0249586 A1 | 8/2018 | Kim et al. |

OTHER PUBLICATIONS

Woon et al., KR 20170107756 A machine translation, Sep. 26, 2017, entire translation (Year: 2017).*
International Search Report dated Mar. 20, 2020 in connection with International Patent Application No. PCT/KR2019/017241, 3 pages.
Written Opinion of the International Searching Authority dated Mar. 20, 2020 in connection with International Patent Application No. PCT/KR2019/017241, 5 pages.

* cited by examiner

DECORATION FILM AND ELECTRONIC DEVICE INCLUDING THE SAME

CROSS-REFERENCE TO RELATED APPLICATIONS

This application is based on and claims priority under 35 U.S.C. 119 to Korean Patent Application No. 10-2018-0165256, filed on Dec. 19, 2018, in the Korean Intellectual Property Office, the disclosures of which are herein incorporated by reference in their entireties.

BACKGROUND

1. Field

The disclosure relates to a decoration film and an electronic device including the decoration film.

2. Description of Related Art

With the growths of related technologies, electronic devices such as a smart phone have been developed to have a thin thickness, a reduced weight, a high performance, and various functions so as to improve portability and usability. In addition, recent electronic devices have beautiful exterior designs so as to appeal to consumers.

Meanwhile, in applying various design elements to a case surface of an electronic device, many studies on how to improve beauty and robustness are being conducted.

SUMMARY

Various embodiments of the disclosure provide a decoration film used for a case surface of an electronic device. The decoration film may have various patterns and colors, which can be variously and changeably recognized according to a viewing angle.

According to various embodiments of the disclosure, a decoration film may include an adhesive layer, a first decoration layer, and a second decoration layer. The adhesive layer may be combined with one of a front plate and a rear plate of an electronic device. The first decoration layer may include a first shape-cured layer and a first color layer, wherein the first shape-cured layer is combined with the adhesive layer, has a first three-dimensional pattern, and is cured by an external stimulus, and wherein the first color layer is combined with the first shape-cured layer and has a first color. The second decoration layer may include a second shape-cured layer and a second color layer, wherein the second shape-cured layer is combined with the first color layer, has a second three-dimensional pattern, and is cured by an external stimulus, and wherein the second color layer is combined with the second shape-cured layer and has a second color.

According to various embodiments of the disclosure, an electronic device may include a housing, a display, an adhesive layer, a first decoration layer, and a second decoration layer. The housing may include a front plate facing a first direction, a rear plate facing a second direction opposite to the first direction, and a lateral member surrounding a space between the front plate and the rear plate. The display may be viewed through at least a portion of the front plate. The adhesive layer may be combined with one of the front plate and the rear plate. The first decoration layer may include a first shape-cured layer and a first color layer, wherein the first shape-cured layer is combined with the adhesive layer, has a first three-dimensional pattern, and is cured by an external stimulus, and wherein the first color layer is combined with the first shape-cured layer and has a first color. The second decoration layer may include a second shape-cured layer and a second color layer, wherein the second shape-cured layer is combined with the first color layer, has a second three-dimensional pattern, and is cured by an external stimulus, and wherein the second color layer is combined with the second shape-cured layer and has a second color.

According to various embodiments of the disclosure, the decoration film may include a plurality of decoration layers have various patterns and colors. Depending on a viewing angle, such patterns may be recognized as various new patterns in combination. Similarly, depending on a viewing angle, such colors may be recognized as various new colors in combination.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to accompanying drawings.

Figure 1:
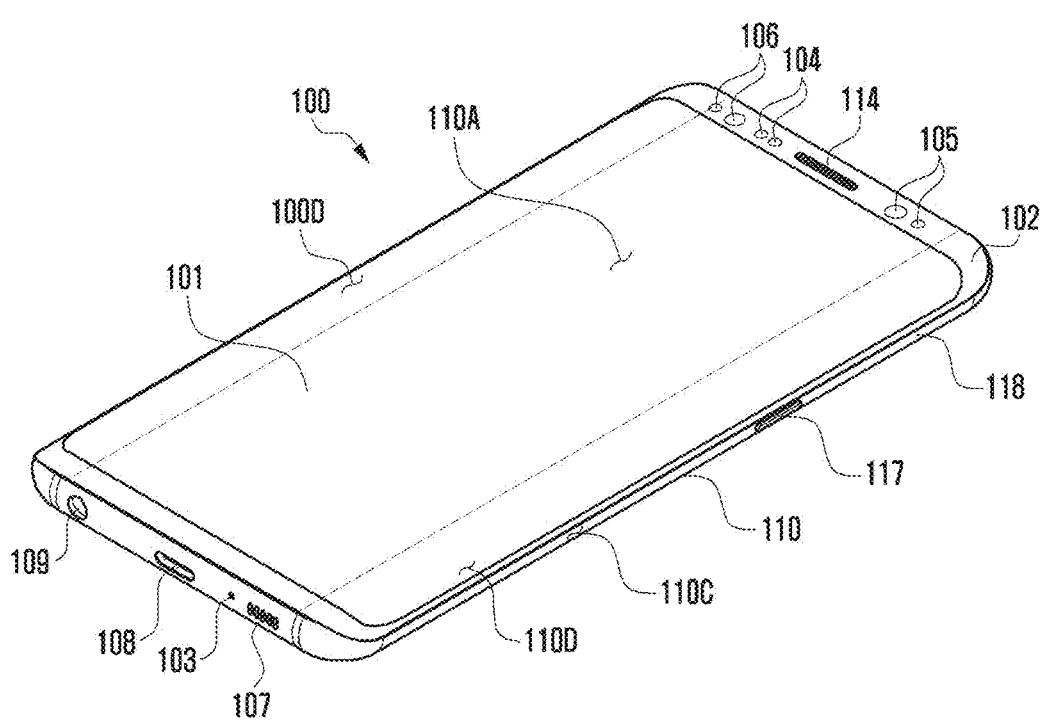
FIG. 1 illustrates a perspective view showing a front surface of an electronic device according to an embodiment.
Figure 2:
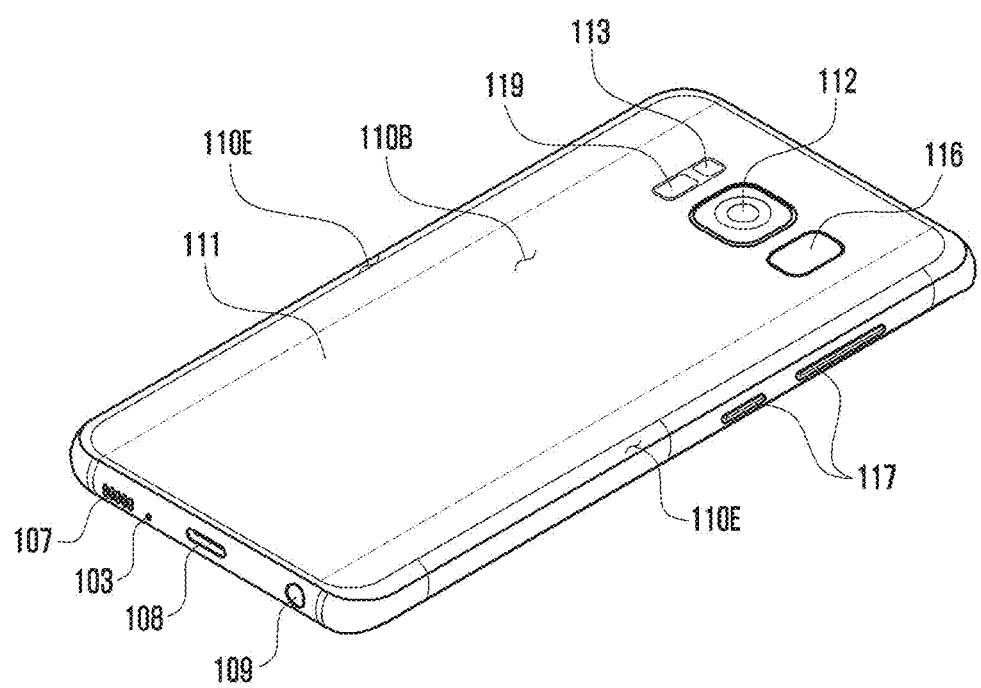
FIG. 2 illustrates a perspective view showing a rear surface of the electronic device shown in FIG. 1.

Referring to FIGS. 1 and 2, according to an embodiment, an electronic device 100 may include a housing 110 that includes a first surface (or front surface) 110A, a second surface (or rear surface) 110B, and a lateral surface 110C that surrounds a space between the first surface 110A and the second surface 110B. According to an embodiment, the housing 110 may refer to a structure that forms a part of the first surface 110A, the second surface 110B, and the lateral surface 110C. According to an embodiment, the first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

In the shown embodiment, the front plate 102 may include two first regions 110D disposed at long edges thereof, respectively, and bent and extended seamlessly from the first surface 110A toward the rear plate 111. In the shown embodiment, the rear plate 111 may include two second regions 110E disposed at long edges thereof, respectively, and bent and extended seamlessly from the second surface 1108 toward the front plate 102 (refer to FIG. 2). In various embodiments, the front plate 102 (or the rear plate 111) may include only one of the first regions 110D (or of the second regions 110E). In various embodiments, the first regions 110D or the second regions 110E may be omitted in part. In the embodiments, when viewed from a lateral side of the electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

According to an embodiment, the electronic device 100 may include at least one of a display 101, audio modules 103, 107 and 114, sensor modules 104, 116 and 119, camera modules 105, 112 and 113, key input devices 117, a light emitting device 106, and connector holes 108 and 109. In various embodiments, the electronic device 100 may omit at least one (e.g., the key input devices 117 or the light emitting device 106) of the above components, or may further include other components.

The display 101 may be exposed through a substantial portion of the front plate 102, for example. In various embodiments, at least a part of the display 101 may be exposed through the front plate 102 that forms the first surface 110A and the first region 110D of the lateral surface 110C. In various embodiments, outlines (i.e., edges and corners) of the display 101 may have substantially the same form as those of the front plate 102. In an embodiment, the spacing between the outline of the display 101 and the outline of the front plate 102 may be substantially unchanged in order to enlarge the exposed area of the display 101.

In an embodiment, a recess or opening may be formed in a portion of a display area of the display 101 to accommodate at least one of the audio module 114, the sensor module 104, the camera module 105, and the light emitting device 106. In an embodiment, at least one of the audio module 114, the sensor module 104, the camera module 105, the fingerprint sensor 116, and the light emitting element 106 may be disposed on the back of the display area of the display 101. In an embodiment, the display 101 may be combined with, or adjacent to, a touch sensing circuit, a pressure sensor capable of measuring the touch strength (pressure), and/or a digitizer for detecting a stylus pen. In various embodiments, at least a part of the sensor modules 104 and 119 and/or at least a part of the key input devices 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. In various embodiments, the microphone hole 103 and the speaker holes 107 and 114 may be implemented as a single hole, or a speaker (e.g., a piezo speaker) may be provided without the speaker holes 107 and 114.

The sensor modules 104, 116 and 119 may generate electrical signals or data corresponding to an internal operating state of the electronic device 100 or to an external environmental condition. The sensor modules 104, 116 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module 116 (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. In various embodiments, two or more lenses (infrared cameras, wide angle and telephoto lenses) and image sensors may be disposed on one side of the electronic device 100.

The key input devices 117 may be disposed on the lateral surface 110O of the housing 110. In an embodiment, the electronic device 100 may not include some or all of the key input devices 117 described above, and the key input devices 117 which are not included may be implemented in another form such as a soft key on the display 101. In various embodiments, the key input devices 117 may include the sensor module 116 disposed on the second surface 110B of the housing 110.

The light emitting device 106 may be disposed on the first surface 110A of the housing 110, for example. For example, the light emitting device 106 may provide status information of the electronic device 100 in an optical form in various embodiments, the light emitting device 106 may provide a light source associated with the operation of the camera module 105. The light emitting device 106 may include, for example, a light emitting diode (LED), an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

Figure 3:
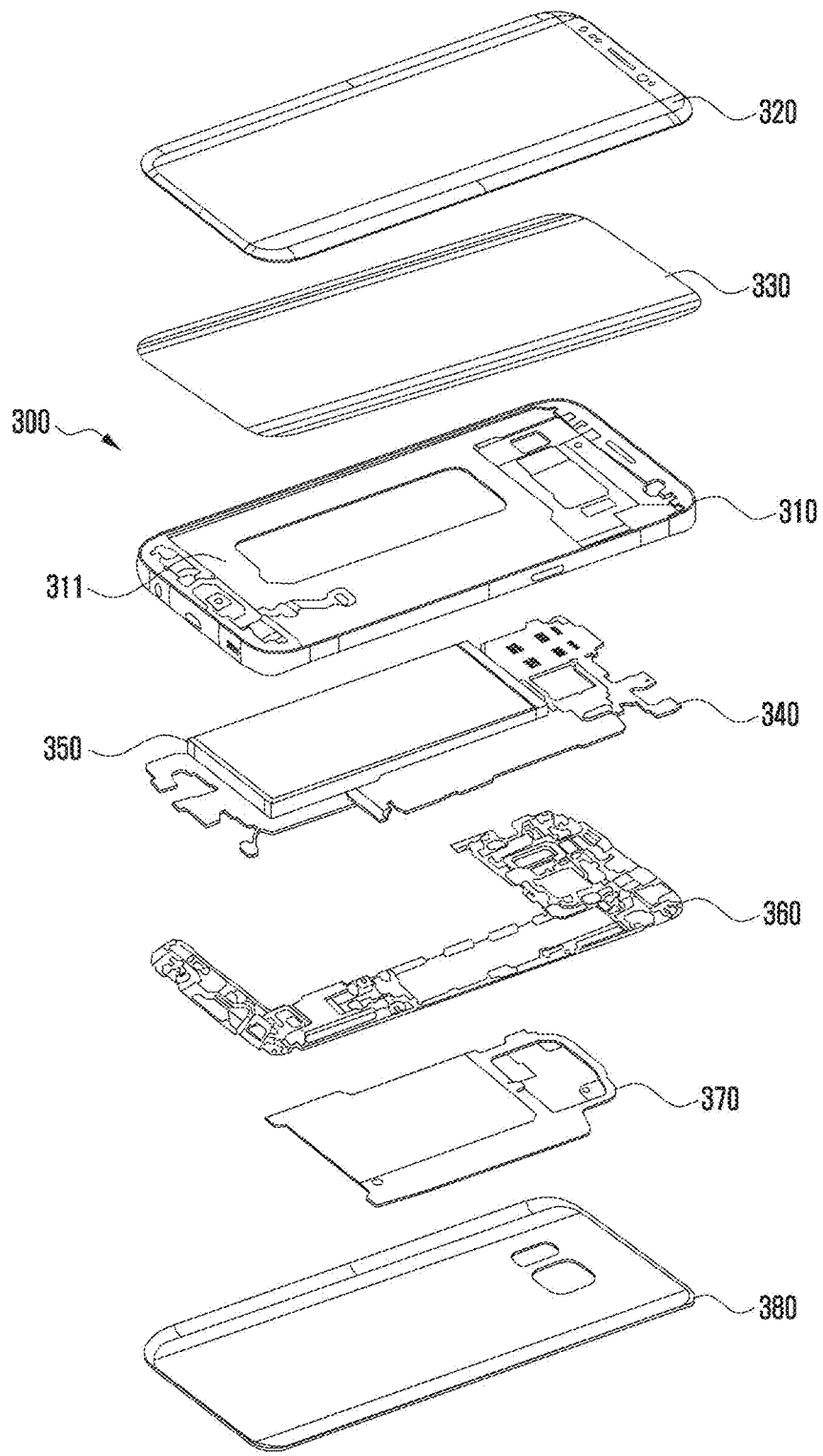
FIG. 3 illustrates an exploded perspective view showing the electronic device shown in FIGS. 1 and 2.

Referring to FIG. 3, the electronic device 300 may include a lateral bezel structure 310, a first support member 311 (e.g., a bracket), a front plate 320, a display 330 (e.g., the display 101), a printed circuit board (PCB) 340, a battery 350, a second support member 360 (e.g., a rear case), an antenna 370, and a rear plate 380. In various embodiment, the electronic device 300 may omit at least one (e.g., the first support member 311 or the second support member 360) of the above components or may further include another component. Some components of the electronic device 300 may be the same as or similar to those of the electronic device 100 shown in FIG. 1 or FIG. 2, thus, descriptions thereof are omitted below.

The first support member 311 is disposed inside the electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the PCB 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the electronic device 300 with an external electronic device and may include a USB connector, an SD card/multimedia card (MMC) connector, or an audio connector.

The battery 350 is a device for supplying power to at least one component of the electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the electronic device 300, and may be detachably disposed from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

Figure 4A:
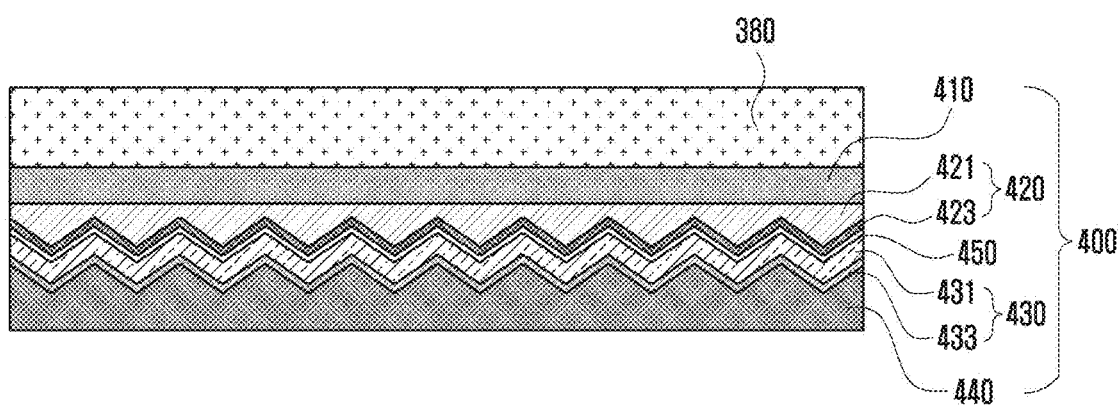
FIGS. 4A and 4B illustrate cross-sectional views schematically showing a decoration film according to an embodiment of the disclosure.
Figure 4B:
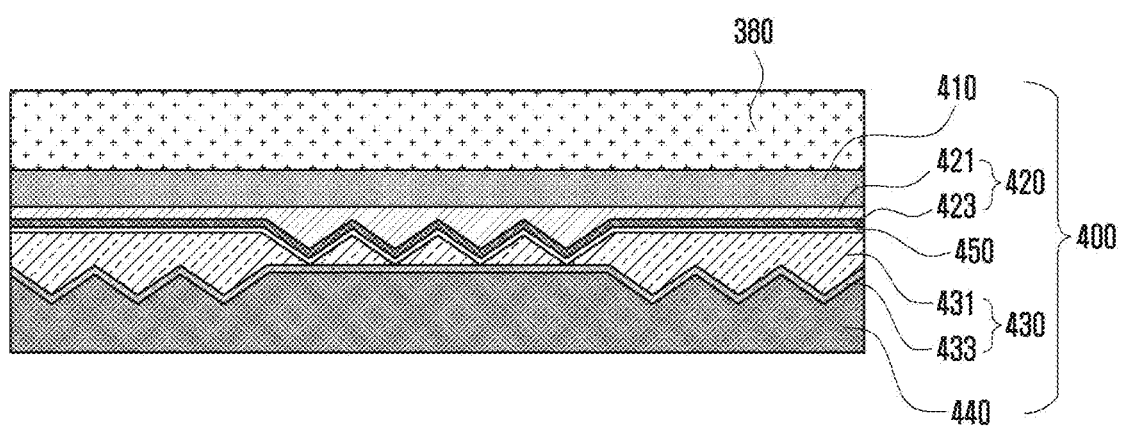

FIGS. 4A and 4B illustrate cross-sectional views schematically showing a decoration film 400 according to an embodiment of the disclosure.

The decoration film 400 according to an embodiment may include an adhesive layer 410, a first decoration layer 420, and a second decoration layer 430.

The adhesive layer 410 according to an embodiment may be combined with an inner surface of the front plate or rear plate of the electronic device. The inner surface of the front plate or rear plate may refer to a surface facing an inner space in which various components of the electronic device are disposed. The adhesive layer 410 may be formed of, for example, a pressure sensitive adhesive (PSA) or an optical clear adhesive (OCA). The adhesive layer 410 may include a processible layer (e.g., a primer layer).

The first decoration layer 420 according to an embodiment may include a first shape-cured layer 421 and a first color layer 423.

Figure 6A:
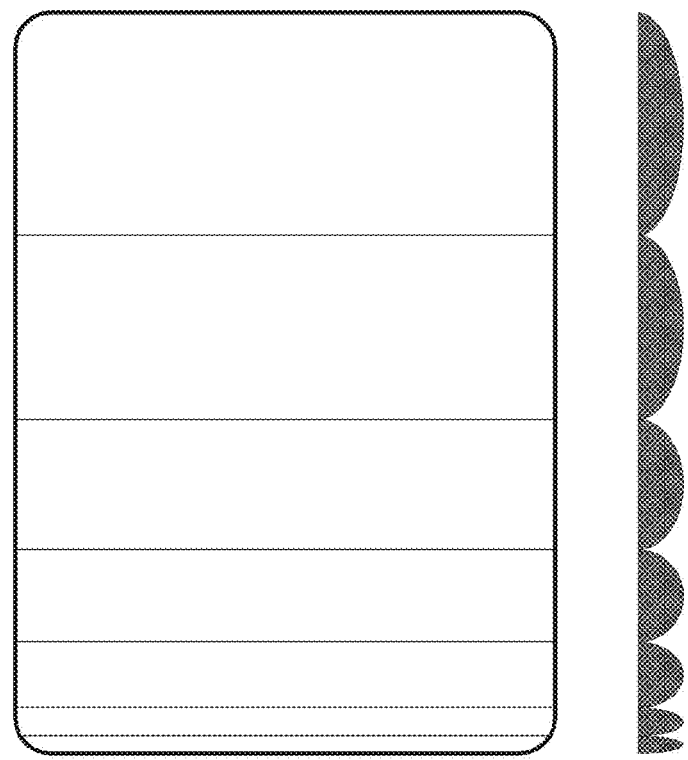
FIGS. 6A to 6F illustrate views showing three-dimensional patterns of a decoration film according to various embodiments of the disclosure.
Figure 6B:
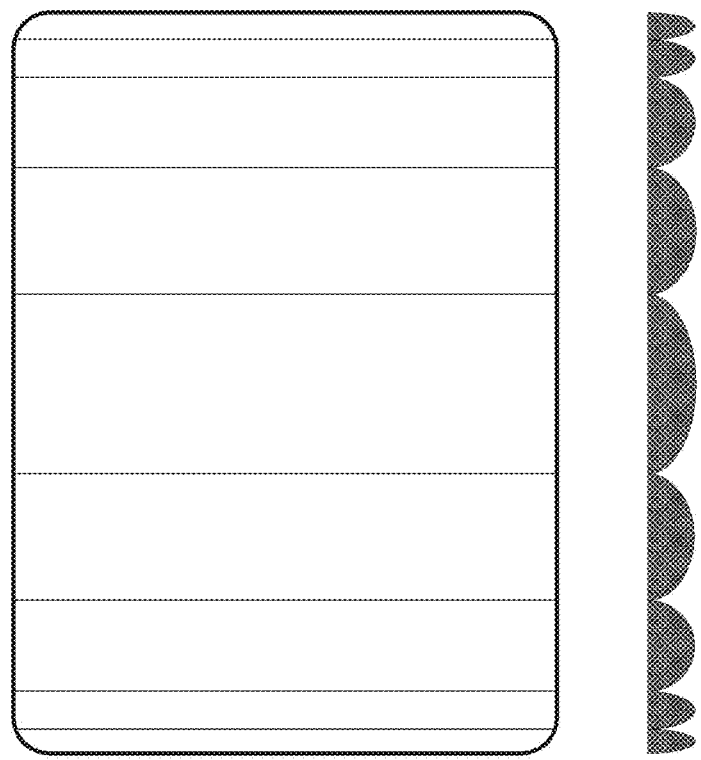
Figure 6C:
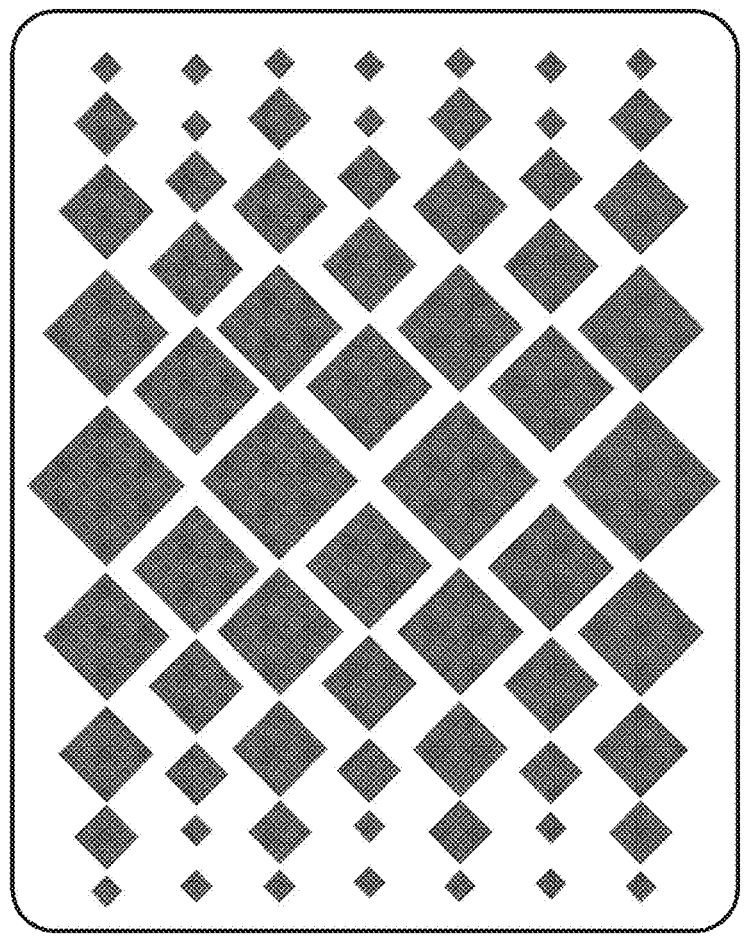
Figure 6D:
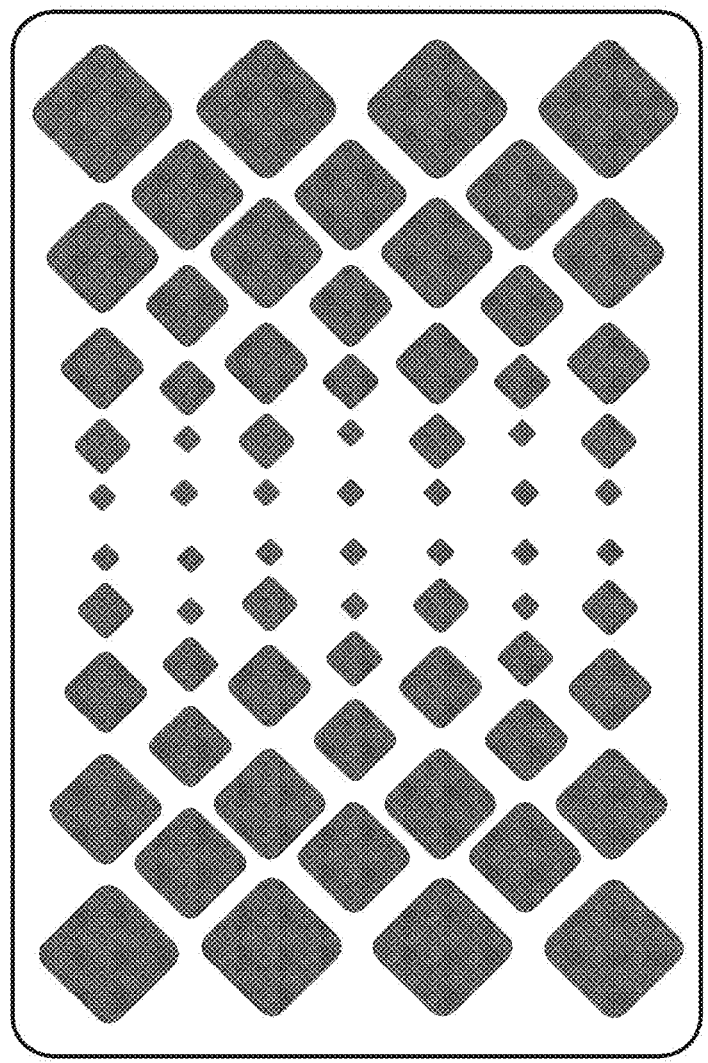
Figure 6E:
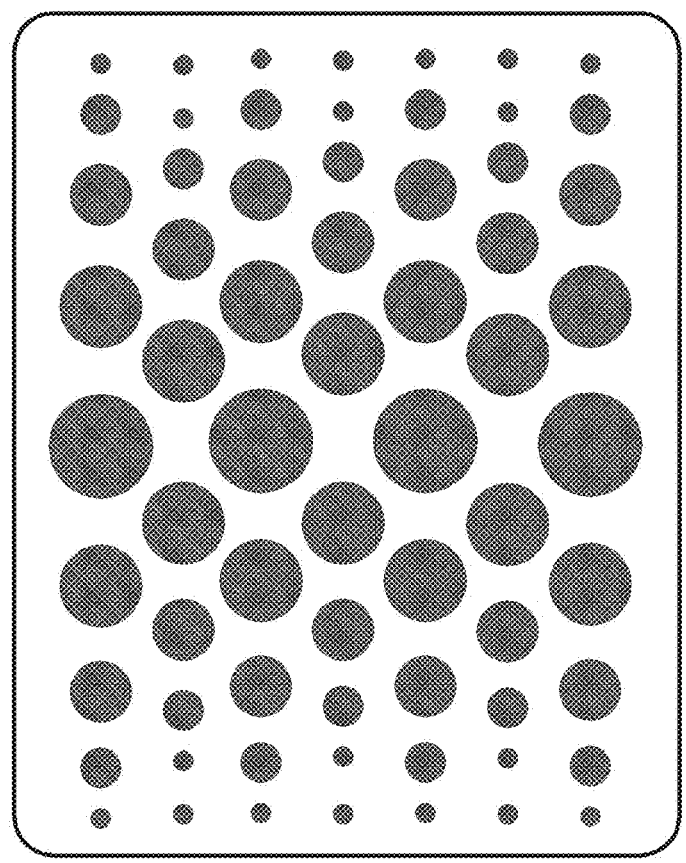
Figure 6F:
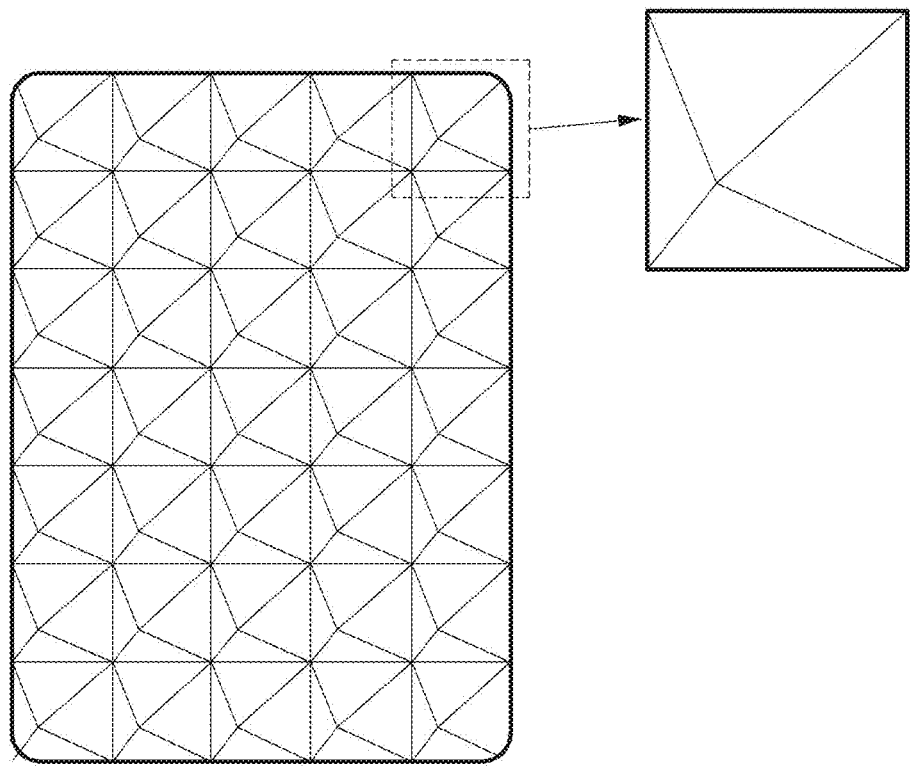

The first shape-cured layer 421 according to an embodiment may be formed by applying a polymer resin in a fluid state to a mold having a first three-dimensional pattern and then curing the applied polymer resin by an external stimulus such as ultraviolet rays. For example, the first shape-cured layer 421 may be formed using a polymer resin composition of acrylic, urethane, or silicone. The first shape-cured layer 421 may be combined with the adhesive layer 410. The first shape-cured layer 421 may have the first three-dimensional pattern distributed over the entire or partial area of the front plate or rear plate. The first shape-cured layer 421 may reflect light in various directions through the first three-dimensional pattern to offer variations in a pattern recognizable to the user. For example, the first three-dimensional pattern may be composed of linear zones repeatedly arranged and gradually changing in size from one end to the other end as shown in FIG. 6A or from a central portion to both ends as shown in FIG. 6B. Alternatively, as shown in FIGS. 6C to 6E, the first three-dimensional pattern may be composed of many circles or polygons repeatedly arranged and gradually changed in size. Alternatively, as shown in FIG. 6F, the first three-dimensional pattern ay be composed of a plurality of repeated pyramid-shaped regions.

The first color layer 423 according to an embodiment may be formed on the first shape-cured layer 421 in various colors. The first color layer 423 may be formed through deposition of a metal or an oxide. For example, depositing a metal such as indium or an oxide such as titanium oxide, silicon oxide, or aluminum oxide on the first shape-cured layer 421 may result in forming the first color layer 423 having a specific color.

The second decoration layer 430 according to an embodiment may include a second shape-cured layer 431 and a second color layer 433.

The second shape-cured layer 431 according to an embodiment may be formed by applying a polymer resin in a fluid state to a mold having a second three-dimensional pattern and then curing the applied polymer resin by an external stimulus such as ultraviolet rays. Curing process may be performed simultaneously for the first and second shape-cured layers 421 and 431. The second shape-cured layer 431 may be combined with the first color layer 423. Like the first shape-cured layer 421, the second shape-cured layer 431 may have the second three-dimensional pattern distributed over the entire or partial area of the front plate or rear plate. The second shape-cured layer 431 may reflect light in various directions through the second three-dimensional pattern to offer variations in a pattern recognizable to the user. Like the first three-dimensional pattern, the second three-dimensional pattern may be formed of various patterns as shown in FIGS. 6A to 6F.

The second color layer 433 according to an embodiment may be formed on the second shape-cured layer 431 in various colors. Like the first color layer 423, the second color layer 433 as well may be formed through deposition of a metal or an oxide. For example, depositing a metal such as indium or an oxide such as titanium oxide, silicon oxide, or aluminum oxide on the second shape-cured layer 431 may result in forming the second color layer 433 having a specific color.

The first three-dimensional pattern and the second three-dimensional pattern may be identical or similar to each other as shown in FIG. 4A, or may be different from each other as shown in FIG. 4B. In addition, the first color layer 423 and the second color layer 433 may be formed in identical or similar colors or in completely different colors.

When the first and second three-dimensional patterns are identical or similar to each other, the shape of the corresponding pattern may be realized clearer and remarkably. When the first and second three-dimensional patterns are different from each other, a combination of both patterns may create a new three-dimensional pattern. In FIG. 4B, the first and second three-dimensional patterns are illustrated simply with focus on being different. However, a great variety of combinations in different patterns may be used as shown in FIGS. 6A to 6F.

When the first color layer 423 and the second color layer 433 are formed in identical or similar colors, the color(s) may be realized clearer and remarkably by the second shape-cured layer 431 interposed between the first and second color layers 423 and 433. When the first color layer 423 and the second color layer 433 are formed in different colors, the first color, the second color, or any new color resulting from a combination of the first and second colors may be seen to the user, depending on a direction viewed by the user.

Meanwhile, according an embodiment, the decoration film 400 may further include a surface treatment layer 450 interposed between the first color layer 423 of the first decoration layer 420 and the second shape-cured layer 431 of the second decoration layer 430. The surface treatment layer 450 improves the binding strength between the first and second decoration layers 420 and 430 and may be formed by processing a surface of any one of the first color layer 423 or the second shape-cured layer 431. To improve the binding strength, a treatment for increasing the surface energy through, for example, a plasma treatment or an etching treatment may be performed.

In addition, according an embodiment, the decoration film 400 may further include a shielding printed layer 440 formed on the second color layer 433. The shielding printed layer 440 may not only provide a flat surface onto an uneven surface of the second shape-cured layer 431 but also block various components inside the electronic device from being viewed outside.

Although the above description has used the first and second decoration layers 420 and 430, there are various embodiments. In various embodiments, the decoration film 400 may use much more decoration layers overlapped with each other.

Figure 5A:
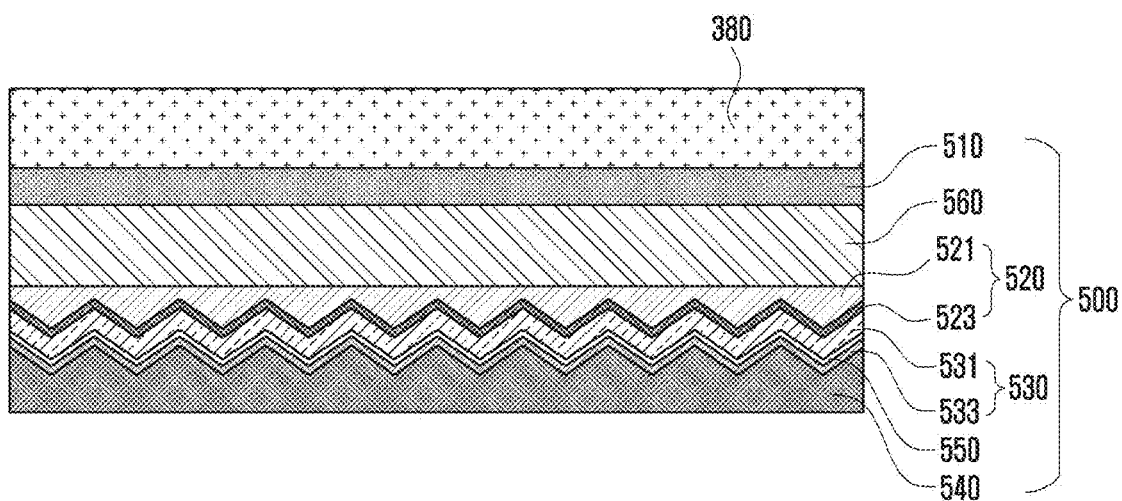
FIGS. 5A and 5B illustrate cross-sectional views schematically showing a decoration film according to an embodiment of the disclosure.
Figure 5B:
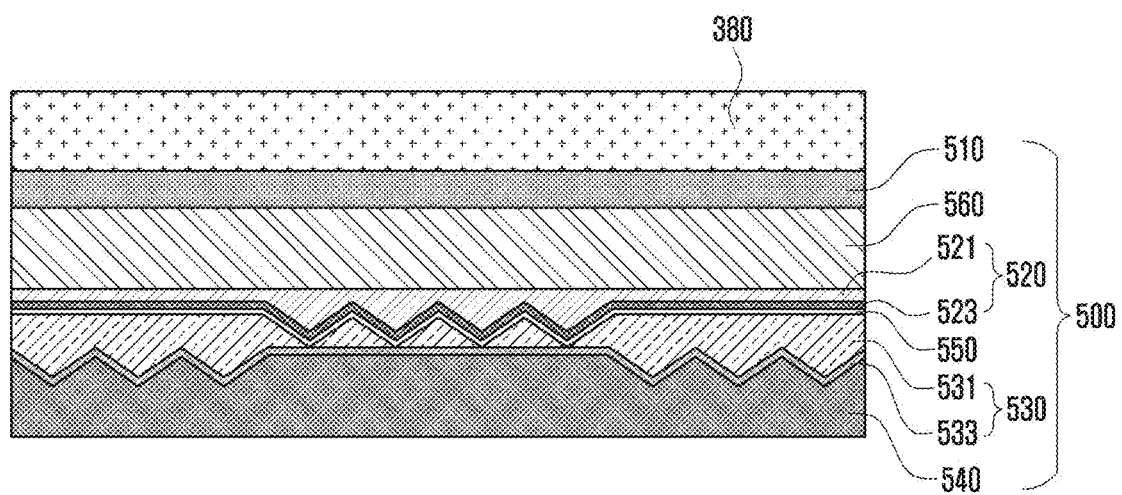

FIGS. 5A and 5B illustrate cross-sectional views schematically showing a decoration film 500 according to an embodiment of the disclosure.

The decoration film 500 according to an embodiment may include an adhesive layer 510, a base film 560, a first decoration layer 520, and a second decoration layer 530.

The adhesive layer 510 according to an embodiment may be combined with an inner surface of the front plate or rear plate of the electronic device. The adhesive layer 510 may be formed of, for example, a PSA or an OCA. The adhesive layer 510 may be in the form of an adhesive tape applied to one surface of the base film 560, and the first decoration layer 520 may be formed on the other surface of the base film 560.

The first decoration layer 520 according to an embodiment may include a first shape-cured layer 521 and a first color layer 523.

The first shape-cured layer 521 according to an embodiment may be formed by applying a polymer resin in a fluid state to a mold having a first three-dimensional pattern and then curing the applied polymer resin by an external stimulus such as ultraviolet rays. For example, the first shape-cured layer 521 may be formed using a polymer resin composition of acrylic, urethane, or silicone. The first shape-cured layer 521 may be combined with the other surface of the base film 560. The first shape-cured layer 521 may have the first three-dimensional pattern distributed over the entire or partial area of the front plate or rear plate. The first shape-cured layer 521 may reflect light in various directions through the first three-dimensional pattern to offer variations in a pattern recognizable to the user. For example, the first three-dimensional pattern may be composed of linear zones repeatedly arranged and gradually changing in size from one end to the other end as shown in FIG. 6A or from a central portion to both ends as shown in FIG. 6B. Alternatively, as shown in FIGS. 6C to 6E, the first three-dimensional pattern may be composed of many circles or polygons repeatedly arranged and gradually changed in size. Alternatively, as shown in FIG. 6F, the first three-dimensional pattern may be composed of a plurality of repeated pyramid-shaped regions.

The first color layer 523 according to an embodiment may be formed on the first shape-cured layer 521 in various colors. The first color layer 523 may be formed through deposition of a metal or an oxide. For example, depositing a metal such as indium or an oxide such as titanium oxide, silicon oxide, or aluminum oxide on the first shape-cured layer 521 may result in forming the first color layer 523 having a specific color.

The second decoration layer 530 according to an embodiment may include a second shape-cured layer 531 and a second color layer 533.

The second shape-cured layer 531 according to an embodiment may be formed by applying a polymer resin in a fluid state to a mold having a second three-dimensional pattern and then curing the applied polymer resin by an external stimulus s as ultraviolet rays. Curing process may be performed simultaneously for the first and second shape-cured layers 521 and 531. The second shape-cured layer 531 may be combined with the first color layer 523. Like the first shape-cured layer 521, the second shape-cured layer 531 may have the second three-dimensional pattern distributed over the entire or partial area of the front plate or rear plate. The second shape-cured layer 531 may reflect light in various directions through the second three-dimensional pattern to offer variations in a pattern recognizable to the user. Like the first three-dimensional pattern, the second three-dimensional pattern may be formed of various patterns as shown in FIGS. 6A to 6F.

The second color layer 533 according to an embodiment may be formed on the second shape-cured layer 531 in various colors. Like the first color layer 523, the second color layer 533 as well may be formed through deposition of a metal or an oxide. For example, depositing a metal such as indium or an oxide such as titanium oxide, silicon oxide, or aluminum oxide on the second shape-cured layer 531 may result in forming the second color layer 533 having a specific color.

The first three-dimensional pattern and the second three-dimensional pattern may be identical or similar to each other as shown in FIG. 5A, or may be different from each other as shown in FIG. 5B. In addition, the first color layer 523 and the second color layer 533 may be formed in identical or similar colors or in completely different colors.

Meanwhile, according an embodiment, the decoration film 500 may further include a shielding printed layer 540 formed on the second color layer 533.

FIGS. 6A to 6F illustrate views showing three-dimensional patterns of a decoration film according to various embodiments of the disclosure.

As described above, the three-dimensional pattern may be provided to each decoration layer (especially, a shape-cured layer) and distributed over the entire or partial area of the front plate or rear plate of the electronic device. In addition, the three-dimensional patterns provided to the respective decoration layers may be identical or similar to each other or different from each other.

Each three-dimensional pattern may be composed of linear zones repeatedly arranged and gradually changing in size from one end to the other end as shown in FIG. 6A or from a central portion to both ends as shown in FIG. 6B. Alternatively, as shown in FIGS. 6C to 6E, each three-dimensional pattern may be composed of many circles or polygons repeatedly arranged and gradually changed in size. Alternatively, as shown in FIG. 6F, each three-dimensional pattern may be composed of a plurality of repeated pyramid-shaped regions.

Figure 7:
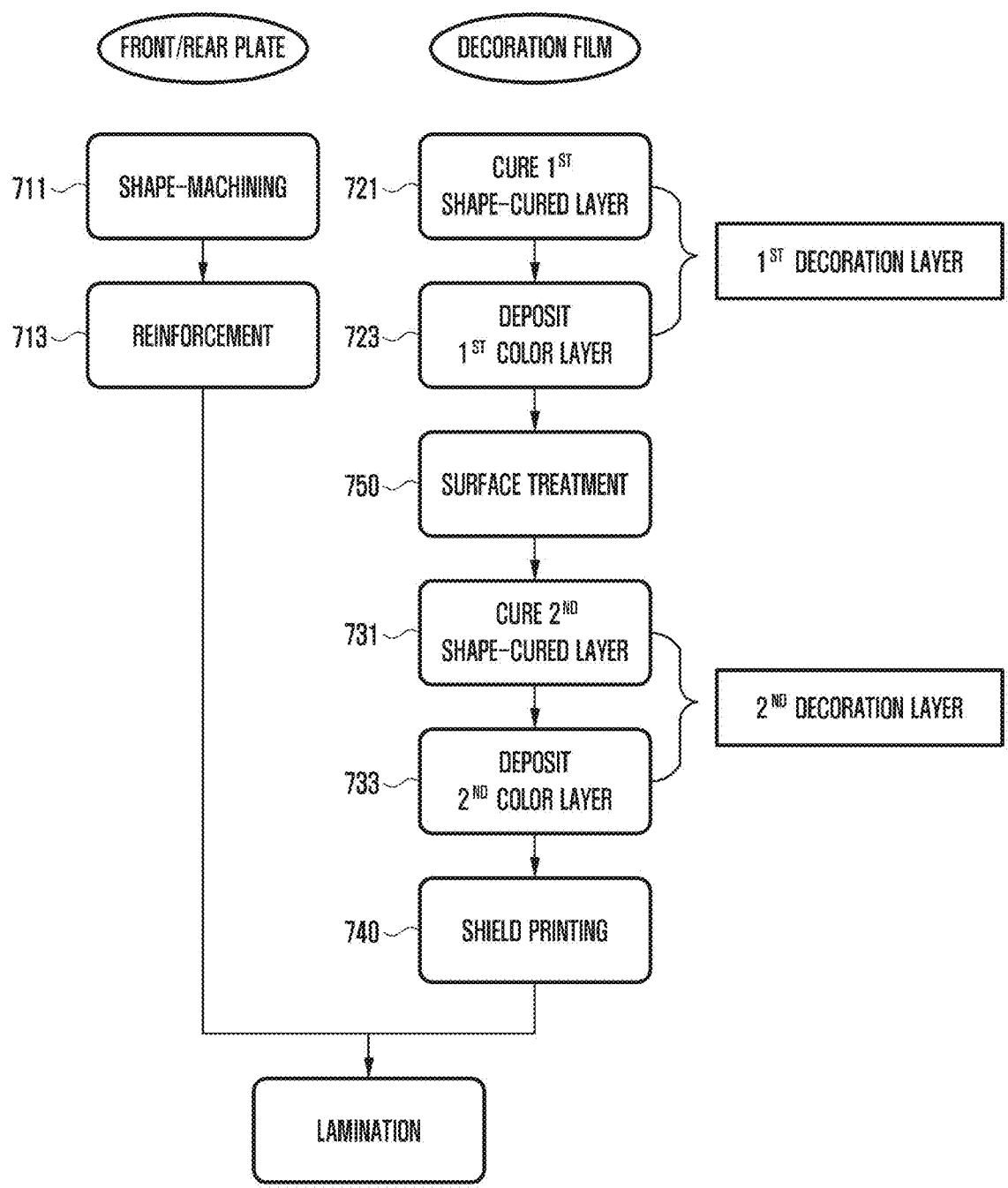
FIG. 7 illustrates a flow diagram illustrating a method of manufacturing a decoration film according to an embodiment of the disclosure.

FIG. 7 illustrates a flow diagram illustrating a method of manufacturing a decoration film according to an embodiment of the disclosure.

According to an embodiment, the front plate or rear plate of the electronic device may be, for example, a reinforced glass fabricated through a shape machining operation 711 and a reinforcement operation 713. Alternatively, any other material, such as plastic, that allows the decoration film to be combined may be used for the front plate or the rear plate.

According to an embodiment, in order to fabricate the decoration film, the first decoration layer may be formed through an operation 721 of curing the first shape-cured layer by ultraviolet rays and an operation 723 of depositing the first color layer. Then, a surface treatment operation 750 may be performed on the first color layer of the first decoration layer. In addition, the second decoration layer may be formed through an operation 731 of curing the second shape-cured layer by ultraviolet rays and an operation 733 of depositing the second color layer. Then, a shield printing operation 740 may be performed on the second color layer. As a result, the decoration film according to an embodiment may be completed.

Thereafter, the decoration film may be combined with the front plate or the back plate through a lamination operation. As a result, the electronic device including the decoration film according to an embodiment of the disclosure can be obtained.

According to various embodiments of the disclosure, a decoration film may include an adhesive layer, a first decoration layer, and a second decoration layer. The adhesive layer may be combined with one of a front plate and a rear plate of an electronic device. The first decoration layer may include a first shape-cured layer and a first color layer, wherein the first shape-cured layer is combined with the adhesive layer, has a first three-dimensional pattern, and is cured by an external stimulus, and wherein the first color layer is combined with the first shape-cured layer and has a first color. The second decoration layer may include a second shape-cured layer and a second color layer, wherein the second shape-cured layer is combined with the first color layer, has a second three-dimensional pattern, and is cured by an external stimulus, and wherein the second color layer is combined with the second shape-cured layer and has a second color.

The decoration film may further include a shielding printed layer formed on the second color layer of the second decoration layer.

In the decoration film, at least one of the first color layer and the second color layer may be formed through deposition of a metal or an oxide.

In the decoration film, the first color of the first color layer and the second color of the second color layer may be different from each other.

The decoration film may further include a surface treatment layer interposed between the first color layer and the second shape-cured layer to improve a binding strength between the first color layer and the second shape-cured layer.

In the decoration film, at least one of the first shape-cured layer and the second shape-cured layer may be formed by applying a polymer resin and curing the applied polymer resin by ultraviolet rays.

In the decoration film, the first three-dimensional pattern of the first shape-cured layer and the second three-dimensional pattern of the second shape-cured layer may be different from each other.

The decoration film may further include a base film interposed between the adhesive layer and the first shape-cured layer.

According to various embodiments of the disclosure, an electronic device may include a housing, a display, an adhesive layer, a first decoration layer, and a second decoration layer. The housing may include a front plate facing a first direction, a rear plate facing a second direction opposite to the first direction, and a lateral member surrounding a space between the front plate and the rear plate. The display may be viewed through at least a portion of the front plate. The adhesive layer may be combined with one of the front plate and the rear plate. The first decoration layer may include a first shape-cured layer and a first color layer, wherein the first shape-cured layer is combined with the adhesive layer, has a first three-dimensional pattern, and is cured by an external stimulus, and wherein the first color layer is combined with the first shape-cured layer and has a first color. The second decoration layer may include a second shape-cured layer and a second color layer, wherein the second shape-cured layer is combined with the first color layer, has a second three-dimensional pattern, and is cured by an external stimulus, and wherein the second color layer is combined with the second shape-cured layer and has a second color.

The electronic device may further include a shielding printed layer formed on the second color layer of the second decoration layer.

In the electronic device, at least one of the first color layer and the second color layer may be formed through deposition of a metal or an oxide.

In the electronic device, the first color of the first color layer and the second color of the second color layer may be different from each other.

The electronic device may further include a surface treatment layer interposed between the first color layer and the second shape-cured layer to improve a binding strength between the first color layer and the second shape-cured layer.

In the electronic device, at least one of the first shape-cured layer and the second shape-cured layer may be formed by applying a polymer resin and curing the applied polymer resin by ultraviolet rays.

In the electronic device, the first three-dimensional pattern of the first shape-cured layer and the second three-dimensional pattern of the second shape-cured layer may be different from each other.

The electronic device may further include a base film interposed between the adhesive layer and the first shape-cured layer.

While the disclosure has been particularly shown and described with reference to embodiments thereof, it will be understood by those skilled in the art that various changes in form and details may be made therein without departing from the scope of the subject matter as defined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A decoration film comprising:
    an adhesive layer combined with one of a front plate of an electronic device or a rear plate of the electronic device;
    a first decoration layer including:
        a first shape-cured layer, the first shape-cured layer disposed in direct contact with the adhesive layer, the first shape-cured layer comprising a first three-dimensional pattern, the first shape-cured layer cured by an external stimulus, and
        a first color layer, the first color layer disposed in direct contact with the first shape-cured layer, the first color layer comprising a first color; and
    a second decoration layer including:
        a second shape-cured layer, the second shape-cured layer disposed in direct contact with the first color layer, the second shape-cured layer comprising a second three-dimensional pattern, the second shape-cured layer cured by an external stimulus, and
        a second color layer, the second color layer disposed in direct contact with the second shape-cured layer, the second color layer comprising a second color,
    wherein the first three-dimensional pattern of the first shape-cured layer and the second three-dimensional pattern of the second shape-cured layer are different from each other, and combine to form a third three-dimensional pattern.

2. The decoration film of claim 1, further comprising a shielding printed layer formed on the second color layer of the second decoration layer.

3. The decoration film of claim 1, wherein at least one of the first color layer and the second color layer is formed through deposition of a metal or an oxide.

4. The decoration film of claim 3, wherein the first color of the first color layer and the second color of the second color layer are different from each other.

5. The decoration film of claim 3, wherein the first color of the first color layer and the second color of the second color layer are the same as each other.

6. The decoration film of claim 1, further comprising a surface treatment layer interposed between the first color layer and the second shape-cured layer, the surface treatment layer improving a binding strength between the first color layer and the second shape-cured layer.

7. The decoration film of claim 1, wherein at least one of the first shape-cured layer and the second shape-cured layer is formed by applying a polymer resin and curing the applied polymer resin by ultraviolet rays.

8. The decoration film of claim 1, further comprising a base film interposed between the adhesive layer and the first shape-cured layer.

9. An electronic device comprising:
    a housing including:
        a front plate facing a first direction,
        a rear plate facing a second direction opposite to the first direction, and
        a lateral member surrounding a space between the front plate and the rear plate;
    a display viewed through at least a portion of the front plate;
    an adhesive layer combined with one of the front plate or the rear plate;
    a first decoration layer including:
        a first shape-cured layer, the first shape-cured layer disposed in direct contact with the adhesive layer, the first shape-cured layer comprising a first three-dimensional pattern, the first shape-cured layer cured by an external stimulus, and
        a first color layer, the first color layer disposed in direct contact with the first shape-cured layer, the first color layer comprising a first color; and
    a second decoration layer including:
        a second shape-cured layer, the second shape-cured layer disposed in direct contact with the first color layer, the second shape-cured layer comprising a second three-dimensional pattern, the second shape-cured layer cured by an external stimulus, and a second color layer, the second color layer disposed in direct contact with the second shape-cured layer, the second color layer comprising a second color, wherein the first three-dimensional pattern of the first shape-cured layer and the second three-dimensional pattern of the second shape-cured layer are different from each other, and combine to form a third three-dimensional pattern.

10. The electronic device of claim 9, further comprising a shielding printed layer formed on the second color layer of the second decoration layer.

11. The electronic device of claim 9, wherein at least one of the first color layer and the second color layer is formed through deposition of a metal or an oxide.

12. The electronic device of claim 11, wherein the first color of the first color layer and the second color of the second color layer are different from each other.

13. The electronic device of claim 11, wherein the first color of the first color layer and the second color of the second color layer are the same as each other.

14. The electronic device of claim 9, further comprising a surface treatment layer interposed between the first color layer and the second shape-cured layer, the surface treatment layer improving a binding strength between the first color layer and the second shape-cured layer.

15. The electronic device of claim 9, wherein at least one of the first shape-cured layer and the second shape-cured layer is formed by applying a polymer resin and curing the applied polymer resin by ultraviolet rays.

16. The electronic device of claim 9, further comprising a base film interposed between the adhesive layer and the first shape-cured layer.

17. An electronic device comprising:
a housing including:
a front plate facing a first direction,
a rear plate facing a second direction opposite to the first direction, and
a lateral member surrounding a space between the front plate and the rear plate;
a display viewed through at least a portion of the front plate;
an adhesive layer combined with one of the front plate or the rear plate;
a first decoration layer including:
a first shape-cured layer, the first shape-cured layer disposed in direct contact with the adhesive layer, the first shape-cured layer comprising a first three-dimensional pattern, the first shape-cured layer cured by an external stimulus, and
a first color layer, the first color layer disposed in direct contact with the first shape-cured layer, the first color layer comprising a first color;
a surface treatment layer disposed in direct contact with the first color layer, the surface treatment layer formed by a plasma treatment or an etching treatment; and
a second decoration layer including:
a second shape-cured layer, the second shape-cured layer disposed in direct contact with the surface treatment layer, the second shape-cured layer comprising a second three-dimensional pattern, the second shape-cured layer cured by an external stimulus, and
a second color layer, the second color layer disposed in direct contact with the second shape-cured layer, the second color layer comprising a second color,
wherein the surface treatment layer improves a binding strength between the first color layer and the second shape-cured layer, and
wherein the first three-dimensional pattern of the first shape-cured layer and the second three-dimensional pattern of the second shape-cured layer are different from each other, and combine to form a third three-dimensional pattern.

* * * * *